| | | |
|---|---|---|
| (12) | United States Patent<br>Genise | (10) Patent No.: US 9,476,461 B2<br>(45) Date of Patent: Oct. 25, 2016 |

(54) ELECTRIC HYBRID MODULE FOR A DUAL CLUTCH TRANSMISSION

(71) Applicant: Eaton Corporation, Cleveland, OH (US)

(72) Inventor: Thomas Alan Genise, Dearborn, MI (US)

(73) Assignee: Eaton Corporation, Cleveland, OH (US)

( * ) Notice: Subject to any disclaimer, the term of this patent is extended or adjusted under 35 U.S.C. 154(b) by 819 days.

(21) Appl. No.: 13/714,509

(22) Filed: Dec. 14, 2012

(65) Prior Publication Data

US 2014/0171259 A1    Jun. 19, 2014

(51) Int. Cl.
| | |
|---|---|
| *F16H 61/68* | (2006.01) |
| *F16D 21/00* | (2006.01) |
| *F16H 61/688* | (2006.01) |
| *F16H 3/08* | (2006.01) |
| *B60K 6/48* | (2007.10) |
| *F16H 3/00* | (2006.01) |
| *F16D 21/06* | (2006.01) |
| *F16H 3/093* | (2006.01) |

(52) U.S. Cl.
CPC .................. *F16D 21/00* (2013.01); *B60K 6/48* (2013.01); *F16H 3/006* (2013.01); *F16H 3/08* (2013.01); *F16H 61/688* (2013.01); *B60K 2006/4808* (2013.01); *B60K 2006/4816* (2013.01); *F16D 21/06* (2013.01); *F16H 2003/0933* (2013.01); *F16H 2200/0004* (2013.01); *F16H 2200/0056* (2013.01); *F16H 2200/0086* (2013.01); *Y02T 10/626* (2013.01); *Y02T 10/6221* (2013.01); *Y02T 10/6256* (2013.01); *Y10T 477/26* (2015.01)

(58) Field of Classification Search
CPC ................................ F16H 61/688; F16H 3/08
See application file for complete search history.

(56) References Cited

U.S. PATENT DOCUMENTS

| | | | |
|---|---|---|---|
| 6,159,127 A | 12/2000 | Loeffler et al. | |
| 6,640,917 B2 | 11/2003 | Maruyama | |
| 7,540,823 B2 | 6/2009 | Kilian et al. | |
| 2009/0266199 A1 | 10/2009 | Jackson | |
| 2011/0126652 A1 | 6/2011 | Genise et al. | |
| 2011/0198139 A1* | 8/2011 | Fuechtner ................ | B60K 6/48<br>180/65.25 |
| 2011/0212801 A1 | 9/2011 | Schrage | |
| 2011/0290072 A1 | 12/2011 | Xie et al. | |
| 2011/0303048 A1* | 12/2011 | Genise .................... | B60K 6/12<br>74/665 A |

FOREIGN PATENT DOCUMENTS

DE            10203514 A1    8/2003

* cited by examiner

*Primary Examiner* — Derek D Knight
(74) *Attorney, Agent, or Firm* — Remarck Law Group PLC (57) ABSTRACT

An adapter module for a dual clutch transmission in a drivetrain is provided. The dual clutch transmission has a first input shaft and a second input shaft concentric with the first input shaft, a mainshaft, an output shaft, and a countershaft offset from the first and second input shafts. The countershaft is drivably connected to the first input shaft, the second input shaft, and the mainshaft. An alternative power source including an electric machine is provided for the drivetrain. An adapter module is disposed between the dual clutch transmission and the alternative power source. The adapter module has an adapter gearset connecting the electric machine to the dual clutch transmission and at least one clutch configured to (i) selectively drivingly connect the electric machine to the output shaft, and (ii) selectively drivingly connect the electric machine to the countershaft.

13 Claims, 7 Drawing Sheets

ELECTRIC HYBRID MODULE FOR A DUAL CLUTCH TRANSMISSION

TECHNICAL FIELD

Various embodiments relate to an electric hybrid system for use with a dual clutch transmission with a countershaft.

BACKGROUND

Automated mechanical transmissions, such as single input shaft transmissions or dual clutch transmissions, may be equipped with an alternative power source to provide a hybrid drive system. The alternative power source may be an electric machine that is configured to operate as a motor to provide torque and operate as a generator to convert torque to electrical power to charge a battery.

Prior art systems may connect the alternate power source to the transmission in various ways. Often, the electric machine is placed between the master starting clutch and the input shaft to the gearbox of the transmission, and may be referred to as a front motor configuration. This configuration may be used with both medium-duty transmission applications typically having five or six gear ratios and heavy-duty transmission applications typically having ten or more gear ratios.

The front motor configuration has various advantages. The front motor configuration is a parallel architecture in that the engine and electric machine power travel the same power or torque paths to offer redundant operation characteristics. For example, if the electric machine system loses functionality, the vehicle may still operate using the engine and transmission. The front motor configuration is simple, efficient, and modular. The electric machine may use all of the transmission speed or gear ratios for torque multiplication. Also, the electric machine operates in a similar speed range as the engine, which may correspond with an efficient speed range of the electric machine for a large portion of the duty cycle.

However, the transmission may also be limited by a front motor configuration. For a single input, automated mechanical transmission, the transmission interrupts torque delivered through the vehicle driveline to the wheels during all gearshifts, and this interrupts power during acceleration or deceleration. For example, power delivered by an engine and an electric machine is brought to zero for a period of time (i.e., one to two seconds) to allow the transmission to shift by disengaging the current gear and engaging the new gear during an acceleration event. Similarly, the electric machine torque is brought to zero to facilitate downshifts during vehicle braking and deceleration where the electric machine is used as a generator. These torque interrupts during a shift event adversely affect vehicle performance, drivability, and user expectations for a transmission with a front motor configuration.

With a front motor configuration, the combined power and torque of the engine and the electric machine flow through the input shaft of the transmission. Therefore, the sum of the maximum torque of the engine and electric machine cannot exceed the torque rating of the transmission. Also, the operating speed range of the electric machine is largely dictated by the engine speed range, and therefore needs to be a relatively large, slow-turning electric machine unless a gear reduction is placed between the electric machine and the transmission input shaft that allows a smaller, less-expensive, higher-speed electric machine to be used.

Packaging may also be a concern, as the transmission assembly can become long with the front motor configuration. Also the transmission may need to be designed or assembled with the hybrid drive system incorporated from the outset, where the transmission and electric machine system are not modular such that the transmission may be used alone or in combination with the electric machine based on transmission or vehicle requirements.

Other automated mechanical transmissions and dual clutch transmissions use an electric machine positioned elsewhere in the transmission; however, the power or torque flow path of the electric machine typically flows through an input shaft of the transmission or relatively early in the transmission power path causing torques approaching the torque limit of the transmission, leading to the same limitations as the front motor configuration.

SUMMARY

In an embodiment, a drivetrain for a motor vehicle is provided and includes a dual clutch transmission that has a first input shaft and a second input shaft concentric with the first input shaft, a mainshaft, an output shaft, and a countershaft offset from the first and second input shafts. The countershaft is drivably connected to the first input shaft, the second input shaft, and the mainshaft. The drivetrain has an alternative power source including an electric machine. The drivetrain also has an adapter module disposed between the dual clutch transmission and the alternative power source. The adapter module has an adapter gearset connecting the electric machine to the dual clutch transmission and at least one clutch configured to (i) selectively drivingly connect the electric machine to the output shaft, and (ii) selectively drivingly connect the electric machine to the countershaft.

In another embodiment, a transmission for use with an electric hybrid system having an electric machine with a motor output shaft is provided. The transmission has a dual clutch assembly, a first input shaft connected to the dual clutch assembly and having a first headset gear, and a second input shaft connected to the dual clutch assembly and having a second headset gear. A countershaft selectively drivingly connects to the first and second headset gears. The transmission has a mainshaft with at least two selectively engagable gearsets disposed between the countershaft and the mainshaft, and an output shaft connected to the mainshaft. The transmission also has an adapter module with an adapter gearset connected to the motor output shaft and providing a first gear ratio between the motor output shaft and the transmission output shaft and a second gear ratio between the motor output shaft and the transmission countershaft. The adapter module also has at least one clutch configured to (i) selectively drivingly connect the motor output shaft to the transmission output shaft, (ii) selectively drivingly connect the motor output shaft to the transmission countershaft, and (iii) selectively disconnect the motor output shaft from connection with the transmission.

In yet another embodiment, a hybrid adapter module for use with a dual clutch transmission having a countershaft and an output shaft is provided. The hybrid adapter module has an electric machine with a motor shaft, a first layshaft, a second layshaft offset from the first layshaft, an adapter gearset disposed between the first and second layshaft and the motor shaft, and at least one clutch assembly. The at least one clutch assembly is configured to selectively (i) connect the first layshaft to the transmission output shaft to provide a torque path from the electric machine to the transmission output shaft, (ii) connect the second layshaft to the countershaft to provide a torque path from the electric machine to the countershaft, and (iii) disconnect the motor shaft from the first and second layshafts such that the adapter module is in neutral.

Various embodiments of the present disclosure have associated advantages. For example, use of a dual clutch transmission provides for operation of the transmission without torque interrupts during shifting. The dual clutch transmission powershifts between two master clutches as it sequentially changes gears, thereby maintaining power or torque flow to the driveline and wheels during shifts and gear changes. A dual clutch transmission with a front motor configuration may have issues with the transmission torque limit being based on a combined maximum torque available from the engine and the electric machine, as discussed previously. Furthermore, it may be difficult to drive a transmission pump through an electric machine mounted between the engine and the transmission if the pump needs to be driven at all times to maintain pressure for the master clutches and other actuators. Also, the resulting assembly for a front motor dual clutch transmission typically has a much longer length than a traditional transmission system with no electric machine.

A hybrid adapter module containing an electric machine is connected to the rear or output side of a dual clutch transmission. The adapter module allows selective connection of the electric machine to the output side of the dual clutch transmission output shaft or countershaft. By connecting the electric machine to the dual clutch transmission, gear reduction ratios may be provided that enable use of a smaller, less-expensive, higher-speed electric machine. Furthermore, when the electric machine is connected to the output shaft of the transmission, only engine torque flows through the dual clutch transmission. This allows a larger engine to be used with a given dual clutch transmission compared to a front motor configuration, as the maximum engine torque may generally correspond to the torque limit of the transmission. The majority of the dual clutch transmission components may be sized for the engine torque and power as the electric machine torque and power is added either farther downstream in the transmission power path, or at the transmission output shaft.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
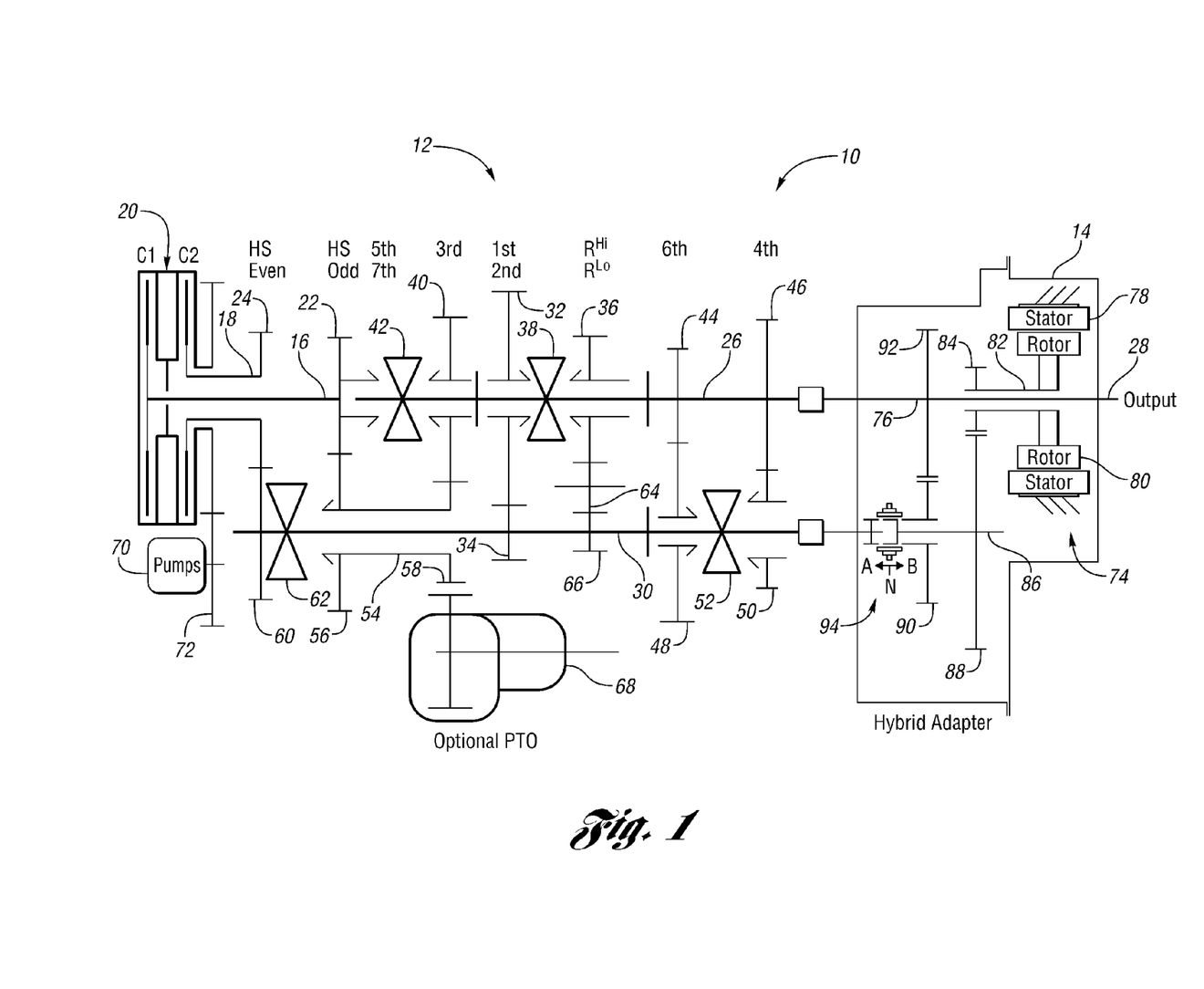
FIG. 1 illustrates a diagram of a dual clutch transmission with a hybrid adapter module according to an embodiment.
Figure 2:
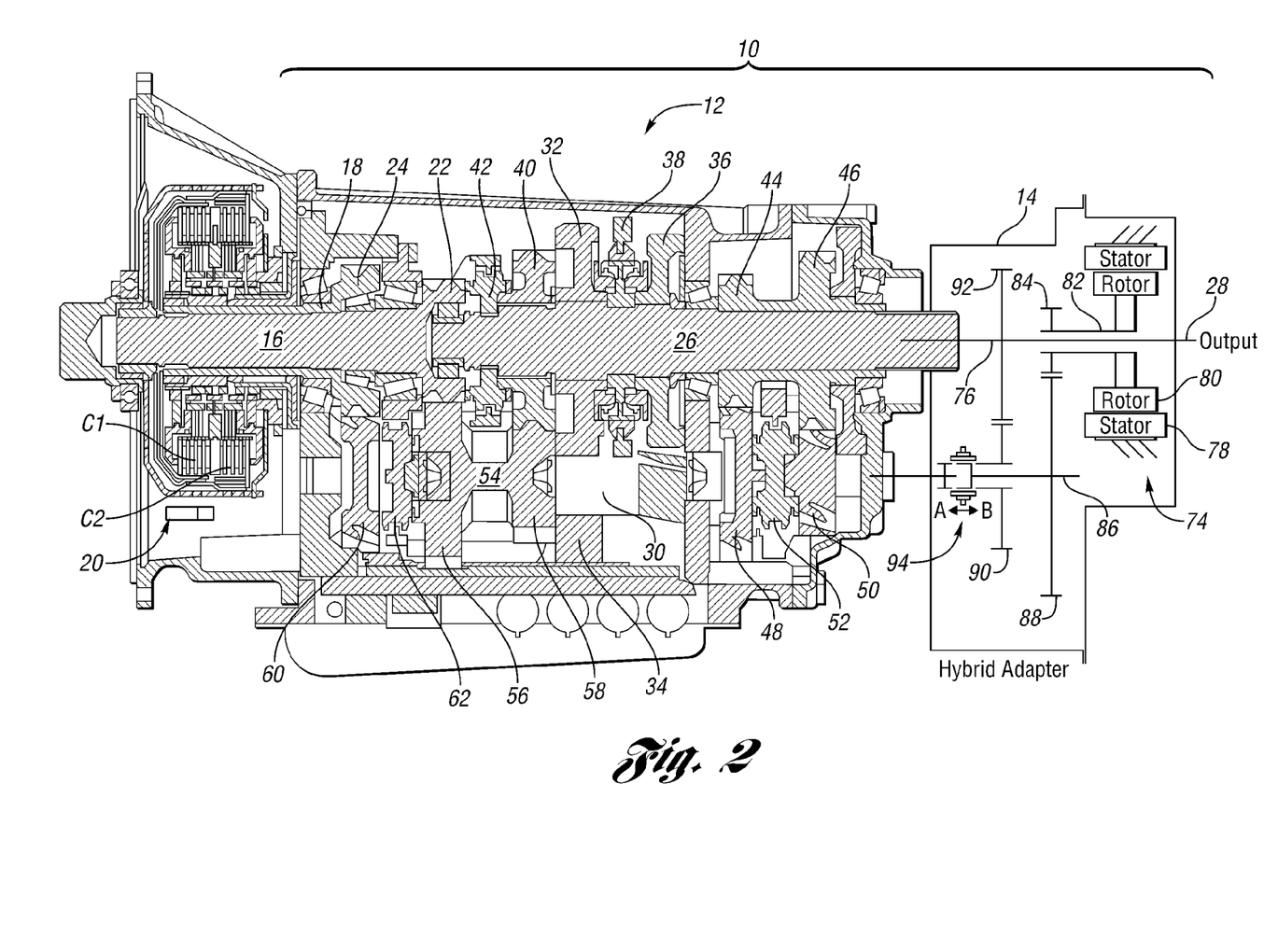
FIG. 2 illustrates a cross-sectional view of the dual clutch transmission with the diagram of the hybrid adapter module as shown in FIG. 1.

FIGS. 1 and 2 illustrate an embodiment of a hybrid-electric powertrain system 10 having a dual clutch transmission 12 and a hybrid adapter module 14. The dual clutch transmission 12 may have various shaft and clutch layouts as are known in the art. The configuration of dual clutch transmission 12 as described below is exemplary and is not critical to the present invention. The dual clutch transmission may be any dual concentric input, single countershaft transmission as is known in the art with associated gear shaft and clutch arrangements. FIG. 1 illustrates the transmission 12 and hybrid adapter module 14 using a diagram, while FIG. 2 illustrates a cross-sectional view of the transmission 12 and a diagram view of the hybrid adapter module.

The dual clutch transmission 12 has a first power input shaft 16 and a second power input shaft 18, which are drivably connected to a vehicle engine (not shown) through a dual clutch arrangement 20. The dual clutch arrangement has a clutch C1 engaged for operation of the transmission 12 in each odd numbered gear or speed ratio, and a clutch C2 engaged for operation of the transmission in each even numbered gear ratio. Clutches C1 and C2 of the dual clutch arrangement connect the engine output shaft to power input shaft 16 and to power input shaft 18, respectively. The second power input shaft 18 is sleeved about and concentric with the first power input shaft 16. A headset gear 22 is formed on power input shaft 16. Input shaft 16 is used as a torque input shaft for odd numbered ratios. Another headset gear 24 is formed on power input sleeve shaft 18. Sleeve shaft 18 is used as a torque input shaft for even numbered ratios.

A transmission mainshaft 26 is coaxial with the input shafts 16, 18, and may be connected to an output shaft 28 for the transmission via a universal joint connection in one example. A single countershaft 30 is offset from the input shafts 16, 18 and the mainshaft 26.

A first ratio and second ratio gear 32 is journaled on mainshaft 26. Gear 32 drivably engages countershaft gear element 34 forming a gear mesh. A low reverse ratio and a high reverse ratio gear 36 is also journaled on mainshaft 26. A ratio change synchronizer clutch assembly 38 is located between mainshaft gears 32 and 36. Synchronizer clutch assembly 38 may be of a design well known in the transmission art. It includes a synchronizer clutch sleeve, which can be shifted in a left-hand direction and in a right-hand direction to connect selectively mainshaft gear 32 to mainshaft 26 and mainshaft gear 36 to mainshaft 26. For example, the sleeve of the clutch assembly 38, when shifted in a right-hand direction, engages a cone clutch element, which causes a blocker ring to block shifting movement of the sleeve into clutch engagement with external clutch teeth on the gear 36 until the speed of gear 36 is synchronized with respect to the speed of mainshaft 26. The sleeve of the clutch assembly 38 has three operating positions including a neutral position, a left position for first or second ratio operation, and a right position for reverse ratio operation.

A third ratio mainshaft gear 40 is journaled on the left end of mainshaft 26. A synchronizer clutch assembly 42 has a sleeve that connects third ratio gear 40 to the mainshaft 26 when it is shifted in a right-hand direction. When the sleeve of the clutch assembly 42 is shifted in the left-hand direction, power input shaft 16 is connected directly to the left end of mainshaft 26.

A sixth ratio mainshaft gear 44 is splined or otherwise secured to mainshaft 26. A fourth ratio mainshaft gear 46 is also splined or otherwise secured to mainshaft 26. Mainshaft gear 44 is in continuous meshing engagement with gear element 48 journaled to the countershaft 30. Mainshaft gear 46 is in continuous meshing engagement with gear element 50 journaled to the countershaft 30.

A synchronizer clutch assembly 52 is located between countershaft gears 48, 50. A sleeve of the clutch assembly 52 drivably engages gear element 50 when it is shifted in a right-hand direction, thereby connecting gear 50 to countershaft 30. When the clutch assembly 52 is shifted in a left-hand direction, it drivably connects gear element 48 to countershaft 30 for sixth ratio operation.

The headset gears 22, 24 provides separate power flow paths from input shaft 16 and input sleeve shaft 18 to a countershaft sleeve shaft 54 and to countershaft 30, respectively. The countershaft sleeve shaft 54 is journaled on countershaft 30.

A first countershaft gear element 56 and a second countershaft gear element 58 are formed on the countershaft sleeve shaft 54. Headset gear 22 is drivably engaged with gear element 56. Mainshaft gear 40 is drivably engaged with countershaft gear element 58. Countershaft gear element 60 is drivably connected to the left end of countershaft 30, and is meshed with headset gear 24.

A synchronizer clutch assembly 62 is located between countershaft gear element 56 and countershaft gear element 60. The sleeve of the clutch assembly 62 may be shifted in a right-hand direction to drivably connect countershaft gear element 56 to the countershaft 30. Synchronizer clutch assembly 62 sleeve is shiftable only in a right-hand direction to connect drivably countershaft gear element 56 to countershaft 30. The clutch assembly 62 is a two position clutch having a neutral and a right-hand position.

Reverse drive gear 36 journaled on mainshaft 26 is drivably meshed with reverse drive pinion 64, which drivably engages reverse drive gear element 66 as shown in FIG. 1. Only reverse drive gear 36 is illustrated in FIG. 2.

The transmission 12 may have a power take off unit (PTO) 68 in some embodiments and is shown in FIG. 1. The PTO 68 is not shown in FIG. 2. The PTO 68 may be meshed with gear 58, or alternatively with gear 34 or gear 66 on the countershaft 30. Alternatively, the transmission 12 may not be equipped with a PTO. The transmission 12 also has a pump 70 with gear 72 meshed with the dual clutch arrangement 20, such that the pump is driven by rotation of the dual clutch arrangement 20 regardless of whether C1 or C2 is engaged.

The transmission 12 may be powershiftable between gear ratios such that there is no torque interrupt during a shift event. For example, during operation in the first speed ratio, clutch C1 is engaged and synchronizer sleeve 62 is shifted to the right. Synchronizer sleeve 38 is shifted to the left to condition the gearing for second ratio operation. Power flow then occurs from the engine to clutch C1 and input shaft 16 to headset gear 22, through clutch assembly 62, countershaft gear element 56, countershaft gear element 34, mainshaft gear 32 and mainshaft 26.

To achieve second ratio operation, clutch C1 is disengaged and clutch C2 is engaged. Engine torque then is delivered to headset gear 24. A power flow path in the second ratio then continues through countershaft gear element 60, countershaft gear element 34, mainshaft gear 32 and mainshaft 26. Synchronizer clutch sleeve 62 then can be shifted to the left to disconnect the first ratio.

To condition the transmission for third ratio operation while operating in the second ratio, clutch C2 remains applied and synchronizer sleeve 42 is shifted to the right, thereby preselecting an upshift to the third ratio.

To effect a ratio change to the third ratio from the second ratio, clutch C2 is disengaged, clutch C1 is engaged and clutch sleeve 38 is shifted to neutral. To condition the transmission for an upshift to the fourth ratio from the third ratio, synchronizer clutch sleeve 42 remains shifted to the right and synchronizer clutch sleeve 52 is moved to the right under zero torque. The fourth ratio is achieved by engaging clutch C2 and releasing clutch C1. Synchronizer clutch sleeve 52 remains shifted at this time to the right thereby preselecting the fifth ratio.

An upshift from the fourth ratio to the fifth ratio is achieved by engaging clutch C1 and disengaging clutch C2. Synchronizer clutch 52 sleeve may remain shifted to the right so that the gearing is preconditioned for a downshift to the fourth ratio. Alternatively, clutch 52 may be shifted to the left to condition the gearing for an upshift to the sixth ratio. Synchronizer clutch sleeve 42 is shifted to the left for both an upshift and a downshift from the fifth ratio. Clutch sleeve 38 is in a neutral position during operation in fifth ratio as well as when sixth ratio is preselected while operating in the fifth ratio.

A ratio change from the fifth ratio to the sixth ratio occurs by disengaging clutch C1 and engaging clutch C2 as synchronizer clutch sleeves 42 and 52 remain shifted to the left.

During a shift to the seventh ratio from the sixth, unlike shifts for the first through sixth ratios, a trading of the engagement of the clutches C1 and C2 does not occur. In this instance, clutch C2 is released and then reapplied as clutch C1 remains released, and so a torque interrupt does occur for this shift. A downshift from the seventh ratio to the fifth ratio may occur by maintaining synchronizer clutch sleeve 42 shifted to the left, and applying clutch C1 and releasing clutch C2 while synchronizer clutch sleeve 62 remains shifted to the right.

The transmission 12 has a high reverse ratio and a low reverse ratio. During operation in the high reverse ratio, clutch C1 is engaged and clutch C2 is disengaged. During operation in the low reverse ratio, clutch C1 is disengaged and clutch C2 is engaged. In both reverse ratios, synchronizer clutch 62 sleeve is shifted into engagement with countershaft gear element 56. Also, synchronizer clutch 38 sleeve is shifted into engagement with reverse gear 36.

The hybrid adapter module 14 may be connected to dual clutch transmission 12 by removing the base rear transmission cover 96 illustrated in FIG. 2, and attaching a hybrid adapter module 14. The hybrid adapter module 14 includes an alternative power source, such as an electric machine 74, associated gearing, and one or more clutch assemblies. The hybrid adapter module 14 includes an adaptor module housing (not shown) that connects to the main case of the transmission 12, using bolts for example, and replaces the removed base rear transmission cover 96.

In FIG. 1, the hybrid adapter module 14 has an electric machine 74 with an output shaft. The electric machine 74 is coaxial with the output shaft 28 of the transmission 12. Shafts of the hybrid adapter module 14 connect to the output shaft 28 and the countershaft 30 of the transmission 12, for example, using spline connections. The hybrid adapter module 14 has a shaft 76, or output shaft, which is drivably connected to the transmission mainshaft 26 and serves as the powertrain output shaft 28. The electric machine 74 has a stator 78 and a rotor 80. The stator 78 is fixed, and may be mounted to the housing for the hybrid adapter module 14. The rotor 80 is connected to a sleeve shaft 82 that is journalled around output shaft 76.

A gear 84 is connected to the sleeve shaft 82. A hybrid adapter module countershaft 86 has a gear 88 that meshes with gear 84. Another countershaft gear 90 is journaled about countershaft 86 and meshes with gear 92 connected to the output shaft 76.

A sliding clutch assembly 94 has three positions. The sleeve of the clutch assembly 94 may be shifted to the right to drivably connect gear 90 with countershaft 86. Power or torque from the electric machine 74 flows from the motor output shaft 82 to gear 84, gear 88, countershaft 86, clutch assembly 94, gear 90, gear 92, and to output shaft 76.

The sleeve of the clutch assembly 94 may also be shifted to the left to drivably connect countershaft 86 to countershaft 30 of the transmission 12. Power or torque from the electric machine 74 flows from the motor output shaft 82 to gear 84, gear 88, countershaft 86, clutch assembly 94, and to countershaft 30 of the transmission 12.

The clutch may be in a neutral position such that power from the electric machine 74 is not transferred to either the countershaft 30 or the output shaft 76, and the electric machine 74 is disconnected from the transmission 12 and the output shaft 76.

Figure 3:
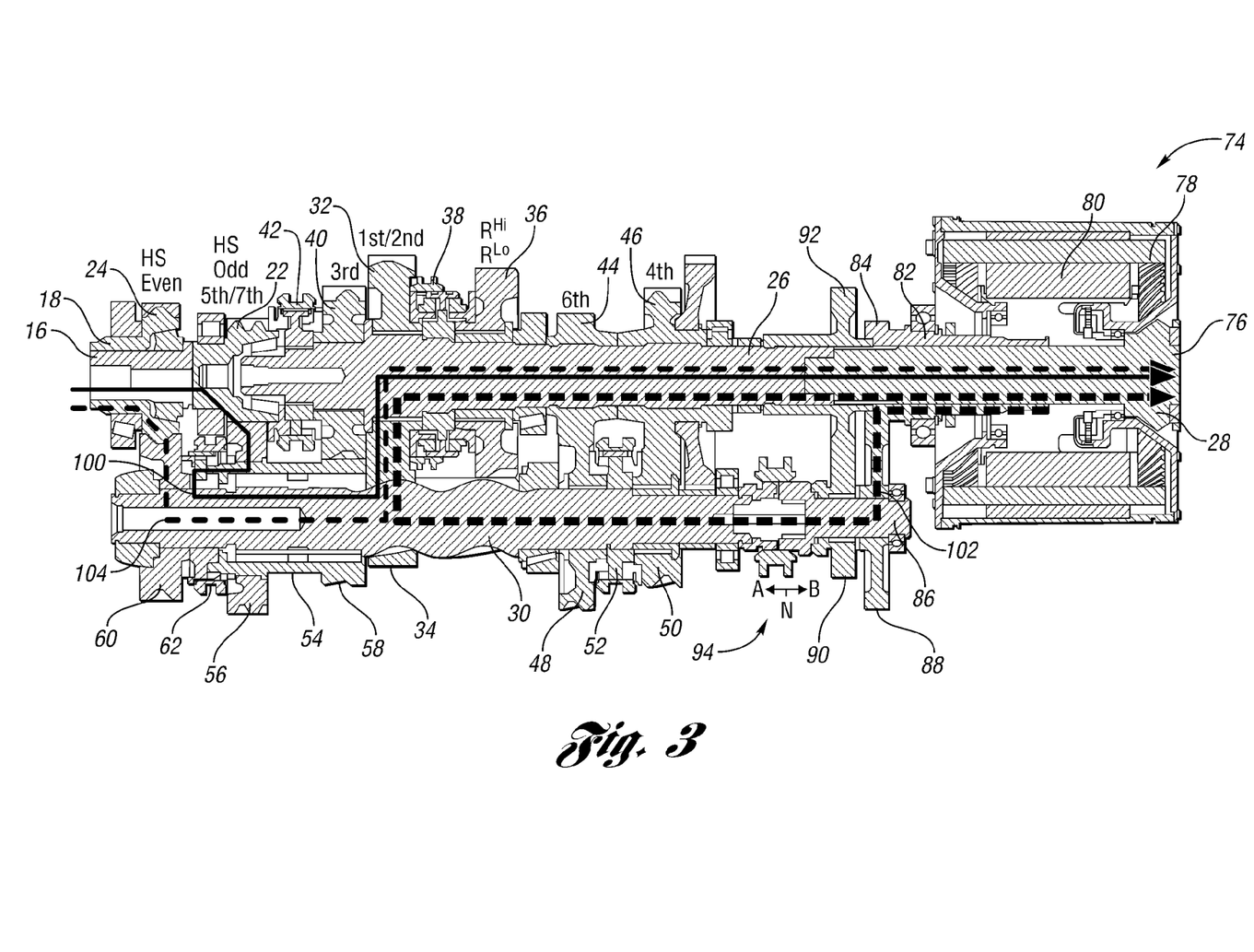
FIG. 3 illustrates power or torque paths for the dual clutch transmission and hybrid adapter module of FIG. 1 according to an embodiment.

FIG. 3 illustrates power paths or torque paths for the powertrain 10 as shown in FIGS. 1-2. The powertrain 10 is in the first speed ratio with the second speed ratio preselected, for example, in a launch state for the powertrain 10. The engine is providing torque to the dual clutch assembly (not shown), and the electric machine 74 is motoring to provide torque to the powertrain 10.

During operation in the first speed ratio, clutch C1 is engaged and synchronizer sleeve 62 is shifted to the right and engaged with gear 56. Clutch 94 is shifted to the left to connect countershaft 86 with countershaft 30. Synchronizer sleeve 38 is shifted to the left to condition the gearing for second ratio operation. Clutches 42 and 52 are in neutral. Power flow from the engine, as shown by line 100, is combined with power flow from the electric machine 74, as shown by line 102, in the powertrain 10. Power flow occurs from the engine to clutch C1 and input shaft 16 to headset gear 22, through clutch assembly 62, countershaft gear element 56, countershaft gear element 34, mainshaft gear 32, mainshaft 26, and to output shaft 76. Power flow occurs from the electric machine 74 to the output shaft 82 and gear 84, to gear 88, countershaft 86, clutch 94, countershaft 30, countershaft gear element 34, mainshaft gear 32, mainshaft 26, and to output shaft 76.

To achieve second ratio operation, power flow from the engine, as shown by line 104, is combined with power flow from the electric machine 74, as shown by line 102, in the powertrain 10. Clutch C1 is disengaged and clutch C2 is engaged. Engine torque then is delivered to headset gear 24. A power flow path 104 from the engine in the second ratio then continues through countershaft gear element 60, countershaft gear element 34, mainshaft gear 32 and mainshaft 26. The electric machine power path 102 remains the same in the first and second speed ratios. Synchronizer clutch assembly 62 then may be shifted to the left to disconnect the first ratio.

Figure 4:
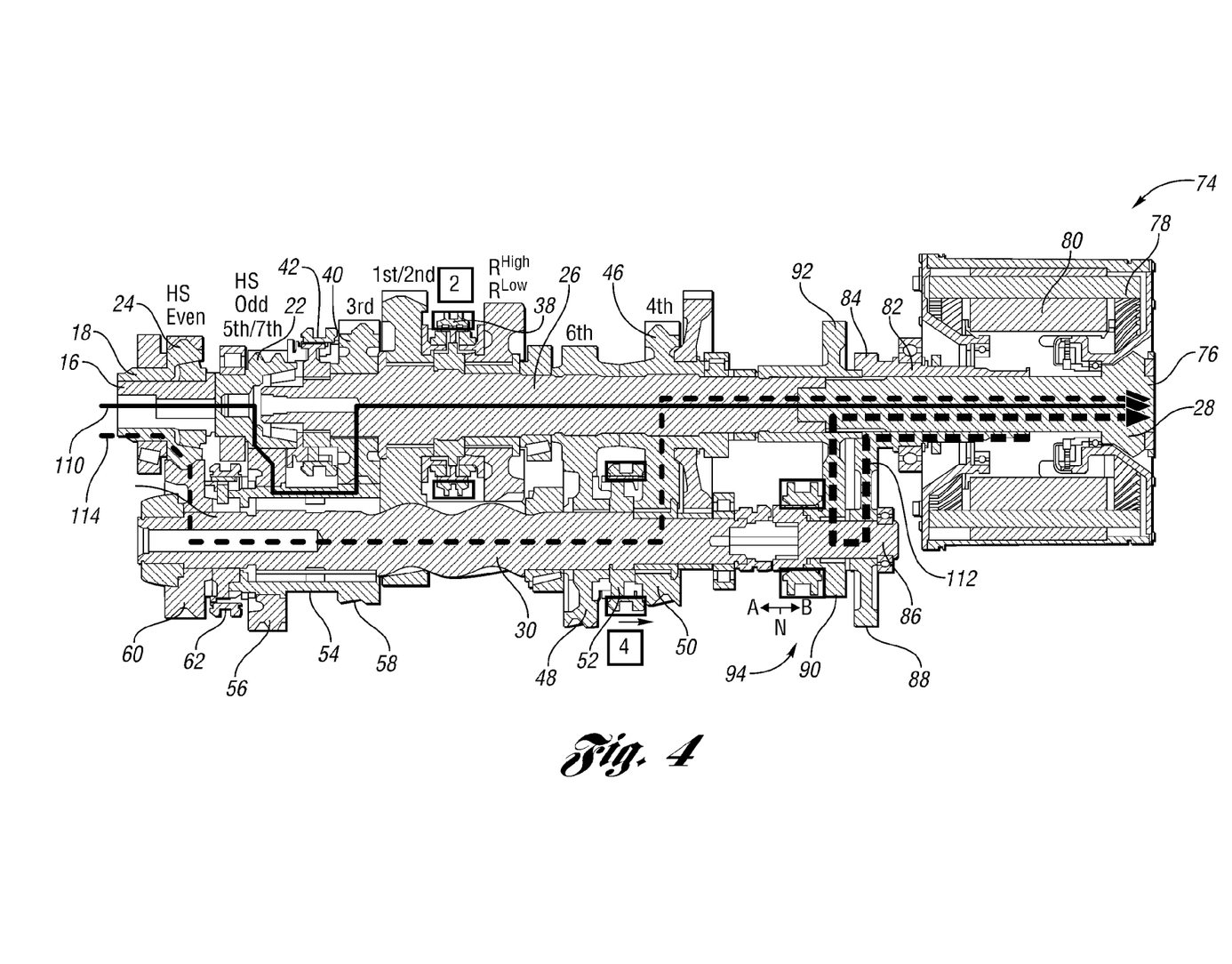
FIG. 4 illustrates power or torque paths for the dual clutch transmission and hybrid adapter module of FIG. 1 according to another embodiment.

FIG. 4 illustrates further power paths or torque paths for the powertrain 10 as shown in FIGS. 1-2. The powertrain 10 is in the third speed ratio with the fourth speed ratio preselected, for example, in a driving state with an even gear preselected. The engine is providing torque to the dual clutch assembly (not shown), and the electric machine 74 is motoring to provide torque to the powertrain 10.

During operation in the third speed ratio, clutch C1 is engaged and clutch assembly 42 is shifted to the right and engaged with gear 40. Clutch 94 is shifted to the right to connect countershaft 86 with gear 90. Synchronizer sleeve 52 is shifted to the right to condition the gearing for fourth ratio operation. Clutches 38 and 62 are in neutral. Power flow from the engine, as shown by line 110, is combined with power flow from the electric machine 74, as shown by line 112, in the powertrain 10. Power flow occurs from the engine to clutch C1 and input shaft 16 to headset gear 22, countershaft gear element 56, countershaft sleeve 54, countershaft gear element 58, mainshaft gear 40, clutch assembly 42, mainshaft 26, and to output shaft 76. Power flow occurs from the electric machine 74 to the output shaft 82 and gear 84, to gear 88, countershaft 86, clutch 94, countershaft gear element 90, gear 92, and to output shaft 76.

To achieve fourth ratio operation, power flow from the engine, as shown by line 114, is combined with power flow from the electric machine 74, as shown by line 112, in the powertrain 10. Clutch C1 is disengaged and clutch C2 is engaged. Engine torque then is delivered to headset gear 24 through input shaft 18. A power flow path 114 from the engine in the fourth ratio then continues through countershaft gear element 60, countershaft 30, clutch assembly 52, countershaft gear element 50, mainshaft gear 46, and mainshaft 26 to the output shaft 76. The electric machine power path 112 remains the same in the third and fourth speed ratios.

Other power flow paths and torque flows paths for the powertrain 10 are also envisioned. For example, the clutch 94 may be shifted to the left, or to the "A" position, for vehicle launch, acceleration boosts, electric-only launch and electric-only drive in lower gears, for pulling up or starting the engine, for operating the electric machine 74 as a generator to charge the battery using power from the engine, and to operate a PTO in electric-only mode. The clutch assembly 94 may be shifted to the right, or to the "B" position, for driving in higher gears, acceleration boosts while driving, and for regenerative braking. The clutch assembly 94 may be placed in neutral during cruise or at other times when it is undesirable to use the electric machine 74, thereby reducing parasitic drag on the powertrain 10 by the electric machine 74.

Figure 5:
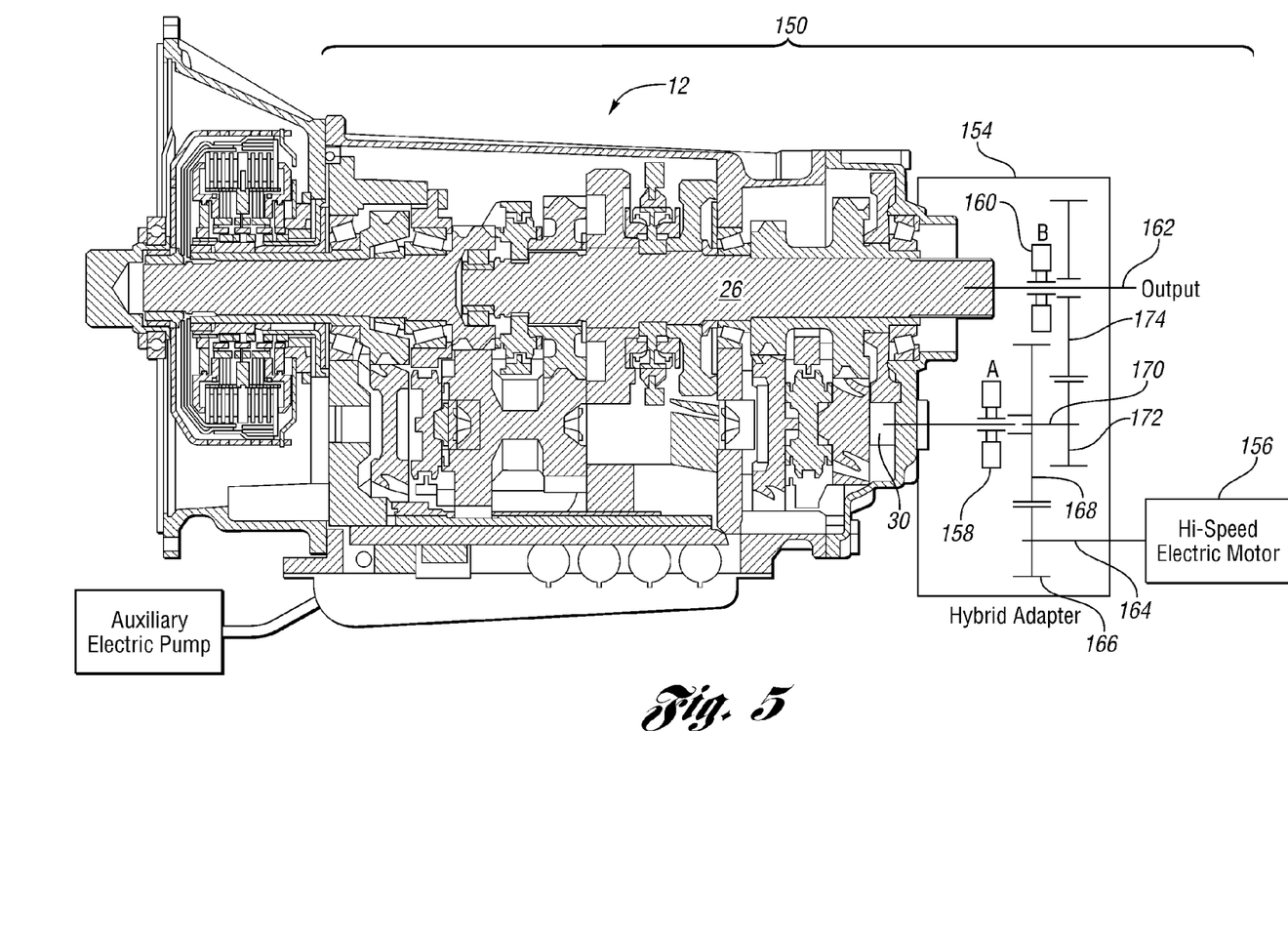
FIG. 5 illustrates a cross-sectional view of the dual clutch transmission of FIG. 1 with a hybrid adapter according to another embodiment.

FIG. 5 illustrates another embodiment of a hybrid adapter module 154 for use with a powertrain 150. The powertrain 150 has a dual clutch transmission 12 as described previously in FIGS. 1-2, and corresponding reference numerals are used for the transmission 12 in FIG. 5. Of course, other dual clutch transmissions may also be used with the hybrid adapter module 154 and powertrain 150 as shown in FIG. 5.

In FIG. 5, the hybrid adapter section 154 has an electric machine 156. The electric machine 156 may be offset from transmission 12 longitudinal axes. The hybrid adapter section 154 has two sliding clutches 158, 160 that allow the system to selectively connect the electric motor 156 to the transmission countershaft 30 or the output shaft 162. The output shaft 162 is connected to the mainshaft 26 of the transmission 12. The output shaft 164 of the electric machine 156 is connected to a gear 166. Gear 166 meshes with gear 168 on shaft 170 that is also connected to gear 172. Gear 172 meshes with gear 174 journaled to output shaft 162.

Clutch assembly 158 connects gear 168 to the transmission countershaft 30 when the clutch 158 is engaged. Clutch assembly 158 in an engaged position corresponds to the A position as described previously. Clutch assembly 160 connects gear 174 to output shaft 162 when clutch 160 is engaged. Clutch assembly 160 in an engaged position corresponds to the B position described previously. When both clutches 158, 160 are disengaged, the electric machine 156 is disconnected from the transmission 12 and output shaft 162, and the adapter system 154 is in neutral.

Figure 6:
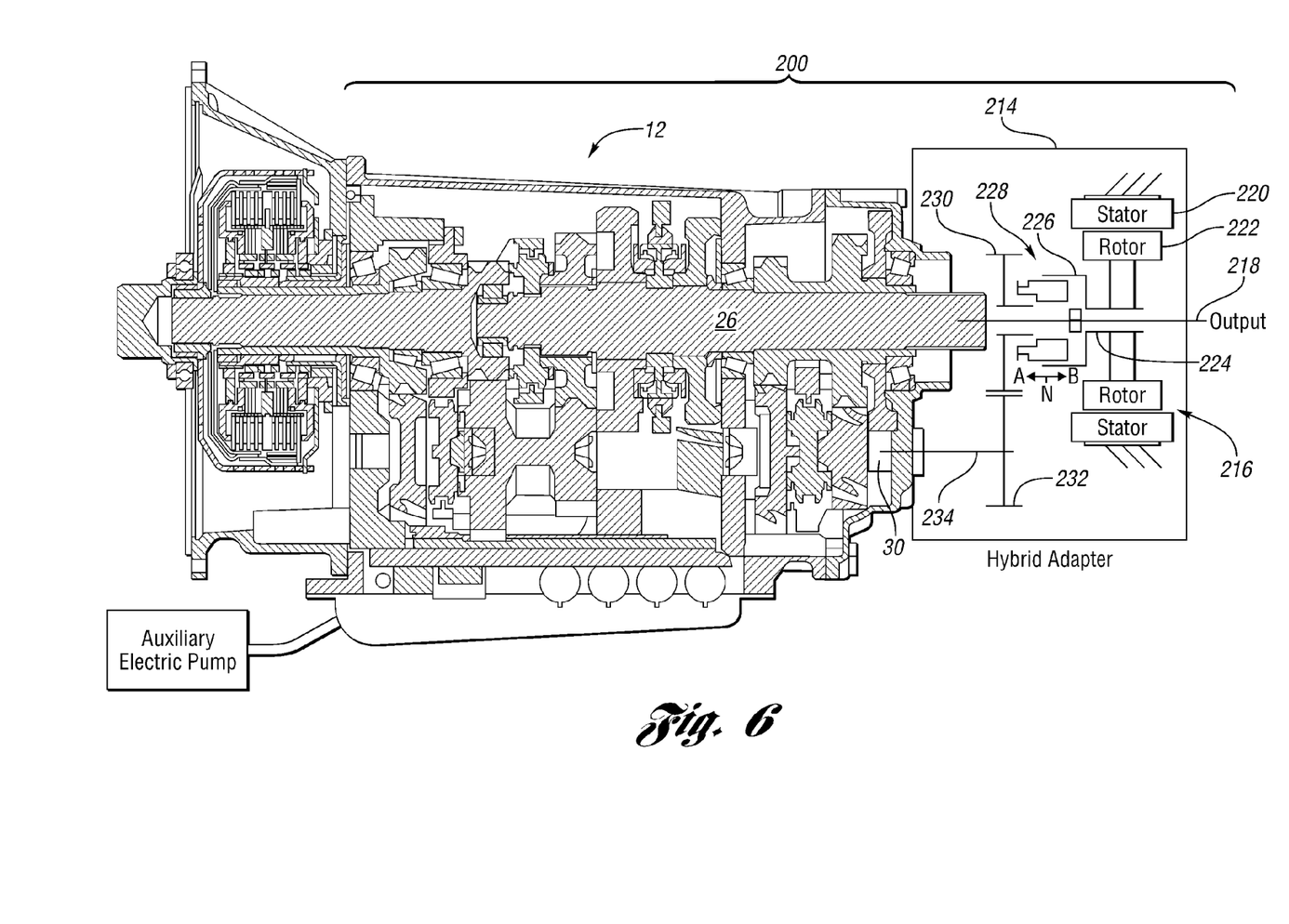
FIG. 6 illustrates a cross-sectional view of the dual clutch transmission of FIG. 1 with a hybrid adapter according to yet another embodiment.

FIG. 6 illustrates another embodiment of a hybrid adapter module 214 for use with a powertrain 200. The powertrain 200 has a dual clutch transmission 12 as described previously in FIGS. 1-2, and corresponding reference numerals are used for the transmission 12 in FIG. 6. Of course, other dual clutch transmissions may also be used with the hybrid adapter module 214 and powertrain 200 as shown in FIG. 6.

In FIG. 6, the hybrid adapter section 214 has an electric machine 216. The electric machine 216 is coaxial with the transmission 12 mainshaft 26 and powertrain output shaft 218. The stator 220 of the electric machine 216 may be connected to the housing of the hybrid adapter module 214 or otherwise rotationally fixed. The rotor 222 is connected to a sleeve shaft 224 that also acts as the output shaft for the electric machine 216. The sleeve shaft 224 is concentric and coaxial with the output shaft 218. A torque transfer element 226 is connected to the sleeve shaft 224. In one example, the torque transfer element 226 is a member that is connected for rotation to sleeve shaft 224 and has internal splines that are slidingly engaged with sliding clutch 228.

A sliding clutch assembly 228 allows the system 214 to selectively connect the electric machine 216 to the transmission countershaft 30 or the output shaft 218. The output shaft 218 is connected to the mainshaft 26 of the transmission 12. Gear 230 is journaled to the output shaft 218 and meshes with gear 232. Gear 232 is connected to shaft 234. Shaft 234 is connected to the countershaft 30 of the transmission 12.

Clutch assembly 228 has three positions. In a first position, or the A configuration, the clutch assembly 228 is shifted to the left to connect gear 226 to gear 230. In the A configuration, power may flow from the electric machine 216 to the sleeve shaft 224, gear 226, clutch 228, gear 230, gear 232, shaft 234 and to the transmission countershaft 30. In the second position, or the B configuration, the clutch assembly 228 is shifted to the right to connect gear 226 to the output shaft 218 in direct drive. In the B configuration, power may flow from the electric machine 216 to the sleeve shaft 224, gear 226, clutch 228 and to output shaft 218. In the third position, the clutch 228 is in neutral such that the electric machine 216 is disconnected from the transmission 12 and output shaft 218.

Figure 7:
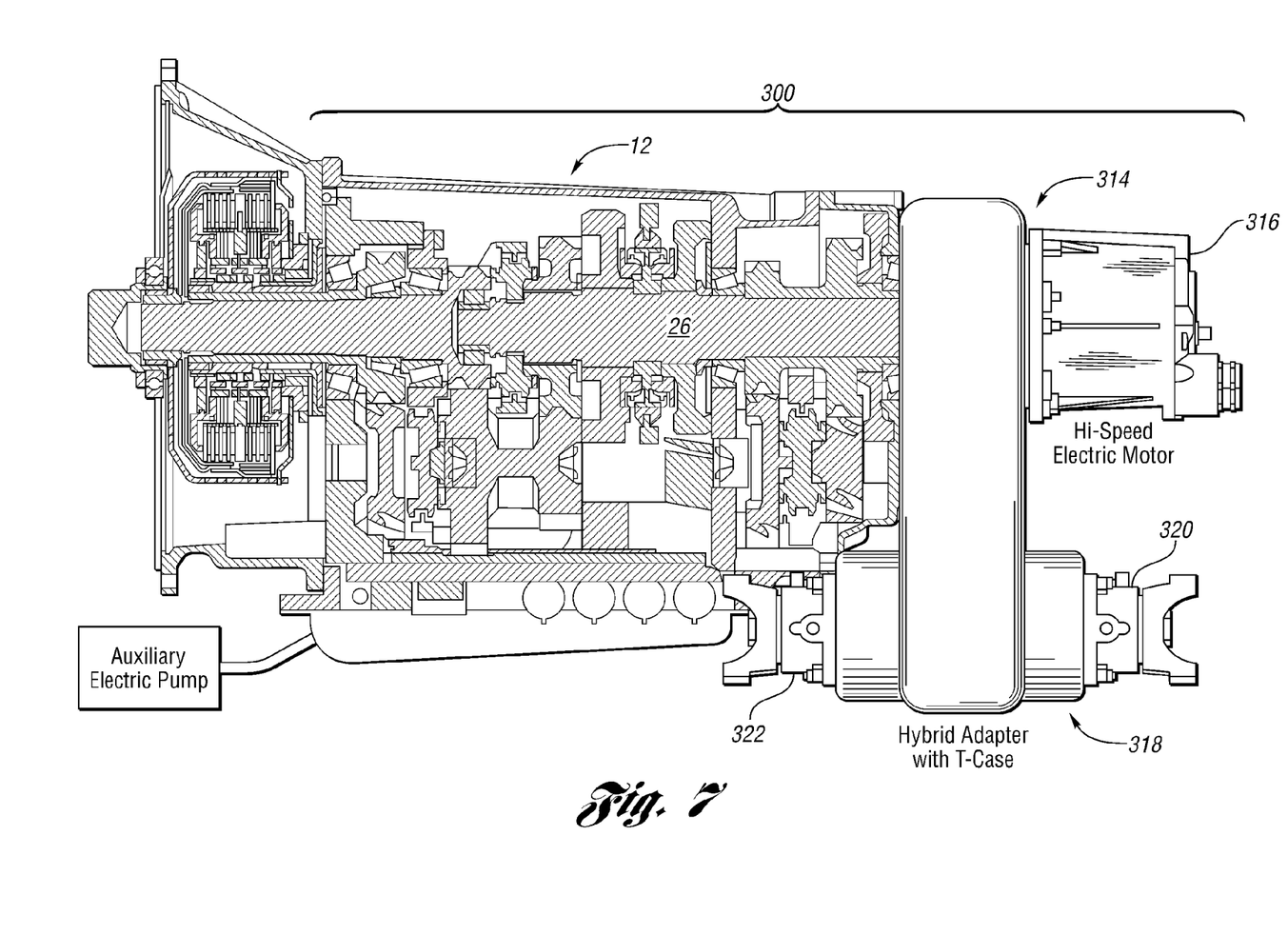
FIG. 7 illustrates a cross-sectional view of the dual clutch transmission of FIG. 1 with a hybrid adapter according to another embodiment.

FIG. 7 illustrates another embodiment of a hybrid adapter module 314 for use with a powertrain 300. The powertrain 300 has a dual clutch transmission 12 as described previously in FIGS. 1-2, and corresponding reference numerals are used for the transmission 12 in FIG. 7. Of course, other dual clutch transmissions may also be used with the hybrid adapter module 314 and powertrain 300 as shown in FIG. 7.

In FIG. 7, the hybrid adapter section 314 has an electric machine 316, and the clutch and gear layout in the hybrid adapter module is similar to that described with respect to FIG. 5, except that the functions of the hybrid adapter module 314 are integrated with a transfer case and all-wheel drive (AWD) differential module 318. The gear layout in the adapter module 314 may be different that shown in FIG. 5; however, the functionality is generally the same. The electric machine 316 is mounted coaxial with the mainshaft 26. The powertrain 300 has two output shafts 320, 322 extending from the transfer case module 318. The shafts 320, 322 may be drivably connected to a front axle and a rear axle of a four-wheel drive or AWD vehicle. The hybrid adapter module 316 contains gear meshes and clutches to selectively connect the electric machine 316 to the countershaft 30 in an A configuration, or to the powertrain output shaft in a B configuration. The powertrain output shaft is connected to a gear arrangement in the transfer case module 318 that provides power to the two output shafts 320, 322 as shown.

Note that in the various embodiments and FIGS. 1-7, one or more of the sliding clutch assemblies may be replaced with a multi-plate wet-friction clutch, a dry-friction clutch, a mechanical synchronizer mechanism, or any number of "rotating member to rotating member" mechanical connection mechanisms as are known in the art. Furthermore, the placement of gears, shafts, clutches and electric machine location, as well as the use of planetary gears or conventional layshaft gears, may be modified.

It should also be noted that the gear ratios employed in the transmission and hybrid adapter modules may be varied to allow for optimization for different vehicle uses, vocations, or to facilitate the use of electric motors with different speed and torque characteristics or maximum speeds. Modifications may be made to use different gear ratios, different gear configurations or gear-types (i.e. planetary gear arrangements) with the powertrain or drivetrain. The hybrid adapter module may be configured in various shapes and forms to meet packaging and torque specifications for various vehicles or to attach to the dual clutch transmission in different manners.

In the various embodiments described herein, an A configuration for the clutch(es) in the hybrid adapter module may be employed to launch the vehicle from rest using the electric machine, to provide boost to accelerate the vehicle during the first one or more speed ratios, to drive the vehicle using electric machine power only, to enable the engine to charge the batteries with the electric machine operating as a generator, to allow the electric machine to start the engine, to allow the electric machine to drive an auxiliary device such as a hydraulic pump through a dual clutch transmission PTO, and other like functions. The A configuration connects the electric machine to the transmission countershaft, and therefore gains the torque multiplication and mechanical advantage of the transmission countershaft gear ratios.

The B configuration for the clutch(es) in the hybrid adapter modules described herein may be used for driving the vehicle during an acceleration event in any gear ratio, to provide regenerative braking energy during vehicle braking, and other like functions. A neutral position with the electric machine disconnected may also be used during some vehicle operations such as vehicle cruise at a constant high speed to minimize parasitic losses resulting from the electric machine being turned when not in use. The B configuration connects the electric machine to the powertrain output shaft, and has some or no torque multiplication. In one example, the B configuration may be used when vehicle speeds are above approximately ten to fifteen miles per hour.

Since the dual clutch transmission is capable of power-shifting between even and odd gears, the electric machine is not provided for torque filling, as is common on a front motor, single input shaft transmission configuration where the electric machine is used to torque fill or provide power during torque interrupts during shifts. The electric machine in the dual clutch system is used to provide power alone or supplement engine power, as torque filling is unnecessary during powershifts.

Use of a dual clutch transmission provides for operation of the transmission without torque interrupts during shifting.

The dual clutch transmission powershifts between two master clutches as it sequentially changes gears, thereby maintaining power or torque flow to the driveline and wheels during shifts and gear changes. A dual clutch transmission with a front motor configuration may have issues with the transmission torque limit being based on a combined maximum torque available from the engine and the electric machine, as discussed previously. Furthermore, it may be difficult to drive a transmission pump through an electric machine mounted between the engine and the transmission if the pump needs to be driven at all times to maintain pressure for the master clutches and other actuators. Also, the resulting assembly for a front motor dual clutch transmission typically has a much longer length than a traditional transmission system with no electric machine.

A hybrid adapter module containing an electric machine is connected to the rear or output side of a dual clutch transmission. The adapter module allows selective connection of the electric machine to the output side of the dual clutch transmission output shaft or countershaft. By connecting the electric machine to the dual clutch transmission, gear reduction ratios may be provided that enable use of a smaller, less-expensive, higher-speed electric machine. Furthermore, when the electric machine is connected to the output shaft of the transmission, only engine torque flows through the dual clutch transmission. This allows a larger engine to be used with a given dual clutch transmission compared to a front motor configuration, as the maximum engine torque may generally correspond to the torque limit of the transmission. The majority of the dual clutch transmission components may be sized for the engine torque and power as the electric machine torque and power is added either farther downstream in the transmission power path, or at the transmission output shaft.

For a front motor configuration of a single input transmission, the countershaft is always drivably connected to the input shaft. The dual clutch transmission has a countershaft that may be selectively disconnected from the input to the transmission from the engine such that the electric machine may selectively be the only power source connected to the countershaft.

Various embodiments of the present disclosure have associated non-limiting advantages. For example, use of a dual clutch transmission provides for operation of the transmission without torque interrupts during shifting. The dual clutch transmission powershifts between two master clutches as it sequentially changes gears, thereby maintaining power or torque flow to the driveline and wheels during shifts and gear changes. A dual clutch transmission with a front motor configuration may have issues with the transmission torque limit being based on a combined maximum torque available from the engine and the electric machine, as discussed previously. Furthermore, it may be difficult to drive a transmission pump through an electric machine mounted between the engine and the transmission if the pump needs to be driven at all times to maintain pressure for the master clutches and other actuators. Also, the resulting assembly for a front motor dual clutch transmission typically has a much longer length than a traditional transmission system with no electric machine.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described.

One or more embodiments have been described as providing advantages or being preferred over other embodiments and/or over prior art with respect to one or more desired characteristics. As such, any embodiments described as being less desirable relative to other embodiments with respect to one or more characteristics are not outside the scope of the claimed subject matter.

What is claimed is:

1. A drivetrain for a motor vehicle comprising: a dual clutch transmission having a first input shaft and a second input shaft concentric with the first input shaft, a mainshaft, an output shaft, and a countershaft offset from the first and second input shafts, the countershaft drivably connected to the first input shaft, the second input shaft, and the mainshaft; an alternative power source including an electric machine having an electric machine output shaft sleeved about the outpus shaft of the transmission; and an adapter module disposed between the dual clutch transmission and the alternative power source, the adapter module having (a) an adapter gearset connecting the electric machine to the dual clutch transmission, the adapted gearset having a first gear on the electric machine output shaft meshed with a second gear on an adapter module countershaft that is coaxial with the transmission countershaft and (b) at least one clutch configured to (i) selectively drivingly connect the electric machine to the output shaft, and (ii) selectively drivingly connect the electric machine to the countershaft, wherein the adapter module has a second adapter gearset with a third gear on the adapter module countershaft meshed with a fourth gear on the transmission output shaft; and wherein the clutch assembly has a first position drivably connecting the adapter module countershaft to the transmission countershaft, a second position drivably connecting the adapter module countershaft to the output shaft through the second gearset, and a third position disconnecting the adapter module countershaft.

2. The drivetrain of claim 1 wherein the at least one clutch is further configured to selectively disconnect the electric machine from the transmission.

3. The drivetrain of claim 1 wherein the mainshaft and output shaft are coaxial with the first and second input shafts.

4. A transmission for use with an electric hybrid system having an electric machine with a motor output shaft, the transmission comprising: a dual clutch assembly; a first input shaft connected to the dual clutch assembly and having a first headset gear; a second input shaft connected to the dual clutch assembly and having a second headset gear; a countershaft selectively drivingly connected to the first and second headset gears; a mainshaft; at least two selectively engagable gearsets disposed between the countershaft and the mainshaft; an output shaft connected to the mainshaft; and an adapter module having: an adapter gearset having (a) a first adapter gearset including a first gear connected to the motor output shaft and meshed with a second gear on an adapter module countershaft and providing a first gear ratio between the motor output shaft and the output shaft of the transmission and (b) a second adapter gearset including a gear on the adapter module countershaft meshed with a gear journalled on the output shaft of the transmission providing a second gear ratio between the motor output shaft and the countershaft of the transmission; and at least one clutch configured to (i) selectively drivingly connect the motor output shaft to the output shaft of the transmission, (ii) selectively drivingly connect the motor output shaft to the countershaft of the transmission, and (iii) selectively disconnect the motor output shaft from connection with the transmission.

5. A hybrid adapter module for use with a dual clutch transmission having a countershaft and an output shaft, the module comprising: an electric machine having a motor shaft; a first layshaft; a second layshaft offset from the first layshaft; an adapter gearset disposed between the first and second layshaft and the motor shaft, the adapter gearset having (a) a first adapter gearset including a first gear connected to the motor shaft and meshed with a second gear on an adapter module countershaft and (b) a second adapter gearset including a gear on the adapter module countershaft meshed with a gear journaled on the output shaft of the dual clutch transmission; and at least one clutch assembly configured to selectively (i) connect the first layshaft to the transmission output shaft to provide a torque path from the electric machine to the transmission output shaft, (ii) connect the second layshaft to the countershaft of the transmission to provide a torque path from the electric machine to the countershaft, and (iii) disconnect the motor shaft from the first and second layshafts such that the adapter module is in neutral.

6. The hybrid adapter module of claim 5 wherein the first layshaft is coaxial with the transmission output shaft.

7. The hybrid adapter module of claim 5 wherein the second layshaft is coaxial with the countershaft of the transmission.

8. A drivetrain for a motor vehicle comprising: a dual clutch transmission having a first input shaft and a second input shaft concentric with the first input shaft, a mainshaft, an output shaft, and a countershaft offset from the first and second input shafts, the countershaft drivably connected to the first input shaft, the second input shaft, and the mainshaft; an alternative power source including an electric machine; and an adapter module disposed between the dual clutch transmission and the alternative power source, the adapter module having an adapter gearset connecting the electric machine to the dual clutch transmission and at least one clutch configured to (i) selectively drivingly connect the electric machine to the output shaft, and (ii) selectively drivingly connect the electric machine to the countershaft, wherein the adapter gearset has a first gear on an electric machine output shaft meshed with a second gear on an adapter module countershaft; and wherein the adapter module has a second adapter gearset with a gear on the adapter module countershaft meshed with a gear journalled on the transmission output shaft.

9. The drivetrain of claim 8 wherein the at least one clutch is further configured to selectively disconnect the electric machine from the transmission.

10. The drivetrain of claim 8 wherein the mainshaft and output shaft are coaxial with the first and second input shafts.

11. The drivetrain of claim 8 wherein an output shaft of the electric machine is sleeved about the output shaft of the transmission.

12. The drivetrain of claim 11 wherein the adapter module countershaft is coaxial with the transmission countershaft.

13. The drivetrain of claim 12 wherein the at least one clutch is a clutch assembly connected to the adapter module countershaft.

* * * * *